United States Patent
Patil et al.

(10) Patent No.: US 8,380,954 B1
(45) Date of Patent: Feb. 19, 2013

(54) FAILOVER METHOD AND SYSTEM

(75) Inventors: Vishal Patil, Morrisville, NC (US);
Stephen Wu, Sacramento, CA (US);
Manish K. Bhuwania, Morrisville, NC (US)

(73) Assignee: Netapp, Inc., Sunnyvale, CA (US)

( * ) Notice: Subject to any disclaimer, the term of this patent is extended or adjusted under 35 U.S.C. 154(b) by 264 days.

(21) Appl. No.: 12/978,191

(22) Filed: Dec. 23, 2010

(51) Int. Cl.
*G06F 12/16* (2006.01)

(52) U.S. Cl. ........................................ 711/162; 711/161

(58) Field of Classification Search .................. None
See application file for complete search history.

(56) References Cited

U.S. PATENT DOCUMENTS

| | | | |
|---|---|---|---|
| 7,426,618 B2* | 9/2008 | Vu et al. | 711/162 |
| 7,634,594 B1* | 12/2009 | Bezbaruah et al. | 710/33 |
| 7,716,184 B1* | 5/2010 | Bromley | 707/640 |
| 7,836,020 B1* | 11/2010 | Rao et al. | 707/649 |
| 7,882,386 B1* | 2/2011 | Potnis et al. | 714/2 |

* cited by examiner

*Primary Examiner* — Than Nguyen
(74) *Attorney, Agent, or Firm* — Klein, O'Neill & Singh, LLP

(57) ABSTRACT

Method and system is provided for performing a failover operation during which a second storage system takes over the management of a storage volume managed by a first storage system. The first storage system may also manage a plurality of replicated copies of the storage volume and maintain metadata for storing information regarding the replicated copies. The failover operation is completed without having the second storage system read all the metadata.

19 Claims, 7 Drawing Sheets

US 8,380,954 B1

FAILOVER METHOD AND SYSTEM

TECHNICAL FIELD

The present disclosure relates to storage systems.

BACKGROUND

Storage systems are commonly used for a variety of purposes, such as providing multiple users with access to shared data, backing up data and others. Various forms of storage systems are used today. These forms include network attached storage (NAS) systems, storage area networks (SANs), direct attached storage (DAS) and others.

A storage system typically includes at least one computing system (may also be referred to as a "server" or "storage server"), which is a processing system configured to store and retrieve data on behalf of one or more client computing systems ("clients") at one or more storage devices. Multiple storage systems may be provided to take over operations of a failed storage system when an error event (may also be referred to as a failover event) occurs.

Conventional systems replicate storage volumes/storage space. The replicated copies are managed by a storage system that stores a data structure for describing the replicated copies. If the storage system fails, then a failover operation is initiated. Before the new storage system can take over the failed storage system, it reads the data structure for various replicated copies. If there are a large number of replicated copies then the failover operation slows down because the new storage system has to read the data structure for all the replicated copies describing the replicated copies. Continuous efforts are being made to efficiently execute a failover operation for continued client access to storage devices.

SUMMARY

In one embodiment, a method and system is provided for performing a failover operation during which a second storage system takes over the management of a storage volume managed by a first storage system. The first storage system may also manage a plurality of replicated copies of the storage volume. The replicated copies may be referred to as "snapshots". The first storage system also maintains metadata regarding the snapshots.

In conventional systems, to complete the failover operation, the second storage system typically reads metadata for all the snapshots. This delays completion of the failover operation and hence, is undesirable.

The method and system disclosed herein completes the failover operation and presents the storage volume to clients without reading the snapshot metadata. The second storage system reads the metadata when an input/output request for a particular snapshot is received after the failover operation has been completed. By reading the metadata on as need basis, the failover operation is completed earlier.

In another embodiment, a machine implemented method is provided. The method includes initiating a failover operation for transferring control of a storage volume from a first storage system to a second storage system. The storage volume representing a segment of storage space at a storage subsystem is replicated at a point in time and stored with a data structure having information regarding the replicated copy. The method transfers control of the storage volume to the second storage system that present the storage volume to a client, without reading the data structure; and accesses the data structure after the failover operation when needed.

In yet another embodiment, a machine implemented method is provided. The method includes configuring a storage volume to be managed by a first storage system and in case of an error event, be managed by a second storage system after a failover operation; passing control of the storage volume from the first storage system to the second storage system, without accessing metadata describing a replicated copy of the storage volume that is generated by the first storage system; and accessing the data structure in response to an input/output request received by the second storage system to access the replicated copy; wherein the second storage system accesses the data structure to respond to the input/output request.

In another embodiment, a machine implemented method is provided. The method includes, presenting a storage volume to a client in response to a failover operation, without accessing a data structure that describes a replicated copy of the storage volume. The replicated copy and the data structure is generated by a first storage system and the storage volume is presented by a second storage system that is configured to take control of the storage volume after a failover event. The method further includes accessing the data structure in response to an input/output (I/O) request to access the replicated copy and the second storage system accesses the data structure to respond to the I/O request after the failover operation.

In yet another embodiment, a system is provided. The system includes a first storage system for managing a storage volume via a primary path; and a second storage system configured to control the storage volume and presenting the storage volume to a client via a secondary path in response to a failover operation without accessing a data structure storing information regarding a replicated copy of the storage volume.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, the terms "component", "module", "system," and the like as used in this disclosure are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

In one embodiment, a method and system is provided for performing a failover operation during which a second storage system takes over the management of a storage space (or storage volume) managed by a first storage system. The first storage system may also manage a plurality of replicated copies of the storage volume. The replicated copies may be referred to as "snapshots". The first storage system also maintains metadata for storing information regarding the snapshots.

In conventional systems, to complete the failover operation, the second storage system typically reads all the metadata for all the snapshots. This delays completion of the failover operation and hence, is undesirable.

The method and system disclosed herein complete the failover operation and presents the storage volume to clients without reading the snapshot metadata. The second storage system reads the metadata when an input/output request for a particular snapshot is received after the failover operation has been completed. By reading the metadata on as need basis, the failover operation is completed earlier.

Figure 1A:
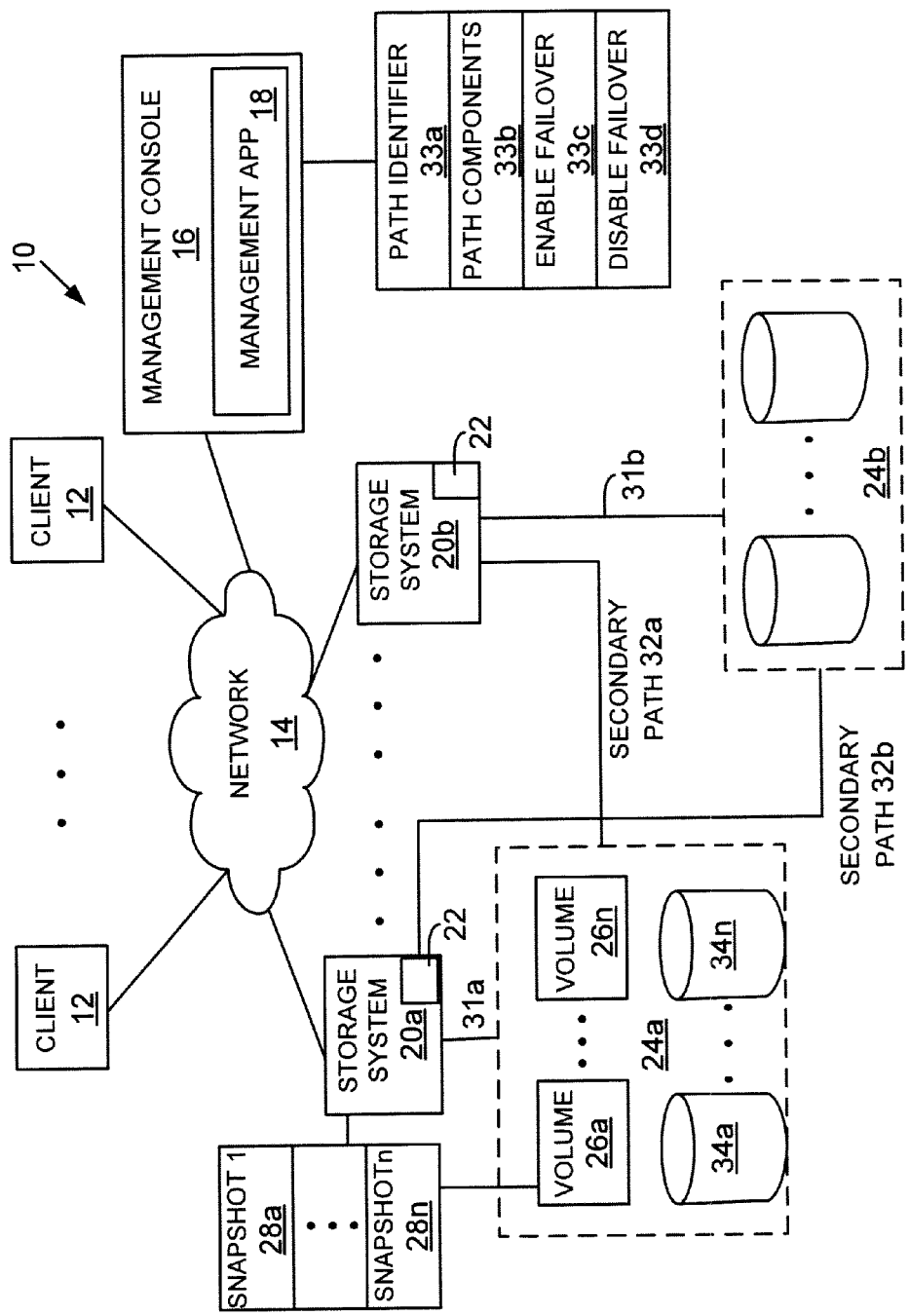
FIG. 1A shows a block diagram of a system using the embodiments disclosed herein.

System:

FIG. 1A shows an example of a non-cluster based system 10 for implementing the various embodiments of the present disclosure, as described below. System 10 may include storage systems 20*a* and 20*b*, each executing an operating system 22 for reading and writing information, to and from storage devices.

In this example, storage system 20*a* operates as a primary storage system for managing storage space within a storage sub-system 24*a* via a primary path 31*a* (may also be referred to as path 31*a*). Storage system 20*b* may manage its own storage sub-system 24*b* via a primary path 31*b* (may also be referred to as path 31*b*).

Storage system 20*b* may also be operationally coupled to storage sub-system 24*a* via a secondary path 32*a* (may also be referred to as path 32*a*). The secondary path 32*b* becomes active when storage system 20*b* has to take over the management of storage sub-system 24*a*, in case there is an error which makes storage system 20*a* inoperable or for any other reason. The operation by which the storage system 20*b* takes over storage sub-system 24*b* is referred to as a "failover" operation, the details of which are provided below.

Storage system 20*a* may also be operationally coupled to storage sub-system 24*b* via a secondary path 32*b* (may also be referred to as path 32*b*). Secondary path 32*b* becomes active during a failover operation, if storage system 20*a* has to take over the management of storage sub-system 24*b*.

The storage systems 20*a* and 20*b* may be operationally coupled to a plurality of clients 12 through a network 14. Each client 12 may be, for example, a conventional personal computer (PC), workstation, or the like. The network 14 may be, for example, a local area network (LAN), a wide area network (WAN), a storage area network (SAN), or any other type of network or a combination of networks. Storage system 20*a* typically receives and responds to various read and write requests from clients 12 directed to data stored in or to be stored at storage sub-system 24*a*. Storage system 20*b* performs similar functions with respect to storage sub-system 24*b*.

Also connected to the network 14 is a management console 16 that may store and execute a management application 18 (may also be referred to as a storage management application 18). The management console 16 may be, for example, a conventional PC, a workstation, or the like.

The processor executable, management application 18 may be used by an administrator to configure and manage a pool of storage devices and various components of system 10. Management application 18 may also be used to generate a data structure 33 that may be used to enable and disable failover operations.

Data structure 33 may include various sub-components, for example, path identifier 33*a*, path components 33*b*, enable failover indicator 33*c* and disable failover indicator 33*d*. During a configuration process step, an administrator using management application 18 may use path identifier 33*a* to identify paths 31*a* and 31*b* as primary paths and paths 32*a* and 32*c* as secondary paths. Management application 18 may discover the paths by sending topology discovery packets to various components of system 10. The nature and format of the packets will depend on a protocol type. For example, the discovery packets may comply with Fibre Channel, InfiniBand or any other protocol that is used for communication within system 10.

Path components 33*b* is used to identify the components within paths 31*a*, 31*b*, 32*a* and 32*b*. The components may be network adapters, storage adapters, switches or any other component that is used by the paths to transmit information.

Enable failover indicator 33*c* is set by management application 18 to enable failover under certain conditions. The condition types may vary and may include certain error types. The details of when a failover operation is initiated is not germane to the embodiments disclosed herein and may vary from one storage environment to another.

When indicator 33*c* is set and if failover conditions are met, then secondary path 32*a* is activated. This allows storage system 20*b* to take over storage sub-system 24*a*. Secondary path 32*b* may also be activated in the same manner.

Disable failover indicator 33*d* may be used to disable a failover operation. If disable failover indicator 33*d* is set, then secondary path 32*a* is not activated even if the failover conditions are met.

It is noteworthy that the two indicators 33*c* and 33*d* may be set by setting a particular value for a single bit. For example, a bit value of 1 may mean that failover is enabled and a bit value of 0 may indicate that failover is disabled. These are examples of enabling and disabling failover and are not to be construed as limiting to the disclosure herein.

Data structure 33 is accessible to management application 18 and may be stored at a memory that is local to management console 16 or remote to management console 16. In another embodiment, data structure 33 may be generated and maintained by any other module, for example, operating system 22 or any other application.

The management application 18 includes a graphical user interface (GUI) module (not shown) to generate a GUI (e.g., for use by an administrator) on a display device (not shown). The GUI may be used by an administrator to configure and set various parameters, for example, to enable or disable failover. In another embodiment, the management application 18 may provide a command line interface (CLI) for use by an administrator for managing and configuring various components of system 10.

Management application 18 is configured to communicate with operating system 22 and different components of system 10 to obtain information regarding various components, for example, to generate data structure 33. To obtain such information, communication between the management application 18, clients 12 and storage systems 20a and 20b may be accomplished using any of the various conventional communication protocols and/or application programming interfaces (APIs), the details of which are not germane to the technique being introduced here. This communication can be done through the network 14 or it can be via a direct link (not shown) between the management console 16 and storage systems 20a and 20b.

Storage sub-system 24a includes a plurality of mass storage devices 34a-34n for storing information that may be configured to operate in different configurations, for example, RAID configurations. The mass storage devices 34a-34n may be, for example, tape drives, conventional magnetic disks, optical disks such as CD-ROM or DVD based storage, magneto-optical (MO) storage, flash memory storage device or any other type of non-volatile storage devices suitable for storing data.

Storage system 20a presents storage space at storage devices 34a-34n as logical volumes 26a-26n to clients 12. The term volume as used herein means a logical data set which is an abstraction of physical storage, combining one or more physical mass storage devices or parts thereof into a single logical storage object. A storage volume from among 26a-26n as presented may appear to be a single storage drive to storage system 20a. However, each volume can represent the storage space in one storage device, an aggregate of some or all of the storage space in multiple storage devices, a RAID group, or any other set of storage space.

Storage volumes 26a-26n are managed by storage system 20a. An administrator (not shown) using management application 18 may configure the storage volumes 26a-26n, such that if there is a failure, storage system 20b is permitted to take over storage volumes 26a-26n via secondary path 32a for responding to client 12 requests. The nature and type of errors/events to trigger a failover operation may be specified by the administrator via management application 18.

To protect information stored via storage volumes 26a-26n it may be replicated at different times. One methodology to replicate storage volumes is by taking "snapshots". The term snapshot as used herein means a point in time copy of a storage file system. The snapshot is a persistent point in time (PPT) image of a file system that enables quick recovery of data after data has been corrupted, lost, or altered. Snapshots can be created by copying data at a predetermined point in time to form a consistent image.

FIG. 1A shows various snapshots 28a-28n for volumes 26a-26n. The snapshots are maintained by operating system 22 of storage system 20a.

Figure 1B:
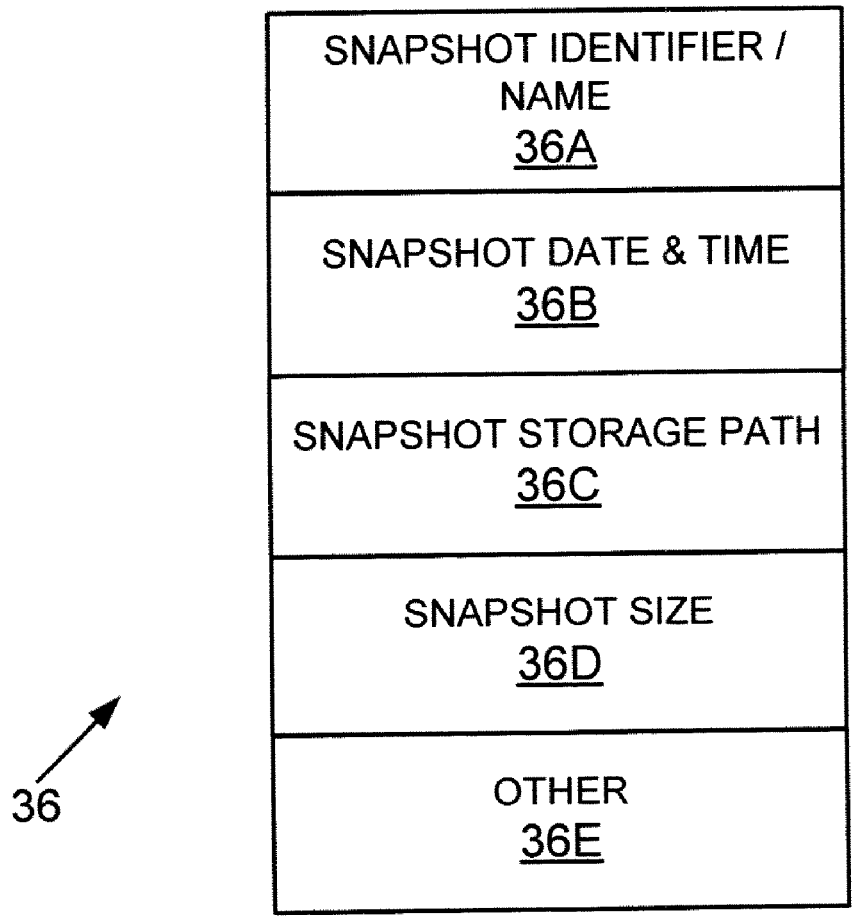
FIG. 1B shows an example of snapshot metadata, used according to one embodiment of the present disclosure.

If a failover event occurs, then a failover operation is initiated during which storage system 20b takes over storage sub-system 24a via secondary path 32a. In conventional systems, to complete the failover operation and before storage volumes 26a-26n are presented to clients 12, operating system 22 of storage system 20b typically reads the metadata 36 (as shown in FIG. 1B) for each snapshot. The snapshot metadata 36 may include a unique snapshot identifier 36a, the date and time the snapshot is taken 36b, the snapshot path 36c as presented to clients 12, the snapshot size 36d, and any other information 36e. If the storage system 20a is supporting various volumes, for example, 1500 volumes and there are 4 snapshot of each volume, then storage system 20b may have to read metadata for all the 6000 snapshots. Reading all the metadata slows the completion of the failover operation and results in undesirable disruption for clients 12 to access storage space for reading and writing information.

The embodiments disclosed herein provide an efficient methodology for completing a failover operation, where storage system 20b does not have to read the metadata 36 for the plurality of snapshots 28a-28n. A processor executable, process flow 38, according to one embodiment is now described below with respect to FIG. 10.

The processor executable process 38 begins with a configuration block 39, during which a storage volume is configured for failover. The configuration may be implemented via a user interface presented by management application 18. During block 39, management application identifies a primary path, for example, 31a and 31b (FIG. 1A) and a secondary path, for example, 32a and 32b. The path information may be stored at data structure 33. Failover may be enabled by setting the "enable failover indicator" 33c such that a secondary path is activated allowing a storage system to takeover a storage sub-system.

A failover operation is initiated in block S40 when a failover event occurs. The nature and type of failover event is not germane to the embodiments disclosed herein but may include any error type that may render storage system 20a inoperable or incapable of servicing clients 12.

In block S42, storage system 20b obtains ownership of volumes 26a-26n via the secondary path 32a. In one embodiment, management application 18 when configuring storage volumes 26a-26n may establish which storage system, upon a failover event, is permitted to assert ownership of volumes 26a-26n. This allows storage system 20b to takeover volumes 26a-26n, upon a failover event.

In block S44, volumes 26a-26n are mounted without reading any metadata 36. This allows storage system 20b to present volumes 26a-26n efficiently because it does not read the metadata before mounting the volumes. The term mounting as used herein means making the volumes available to clients 12. Thereafter, in block S46, storage system 20b presents volumes 26a-26n to clients 12.

The snapshot metadata 36 is read by operating system of storage system 22b on demand, i.e. when needed, in block S48. For example, if a client 12 sends a read request to read a particular snapshot, for example 28a, then storage system 20b reads the metadata associated with snapshot 28a to service the read request. In one embodiment, operating system 22 uses an on-demand snapshot data structure 312 (that is described below with respect to FIG. 3) to access metadata 36 for responding to the read request or any other request for a particular snapshot.

Because storage system 20*b* does not have to read the snapshot metadata, the failover operation is conducted efficiently and clients 12 have faster access to storage space.

The various embodiments disclosed herein may be implemented in a cluster environment. A brief description of a cluster environment is now provided.

Figure 1C:
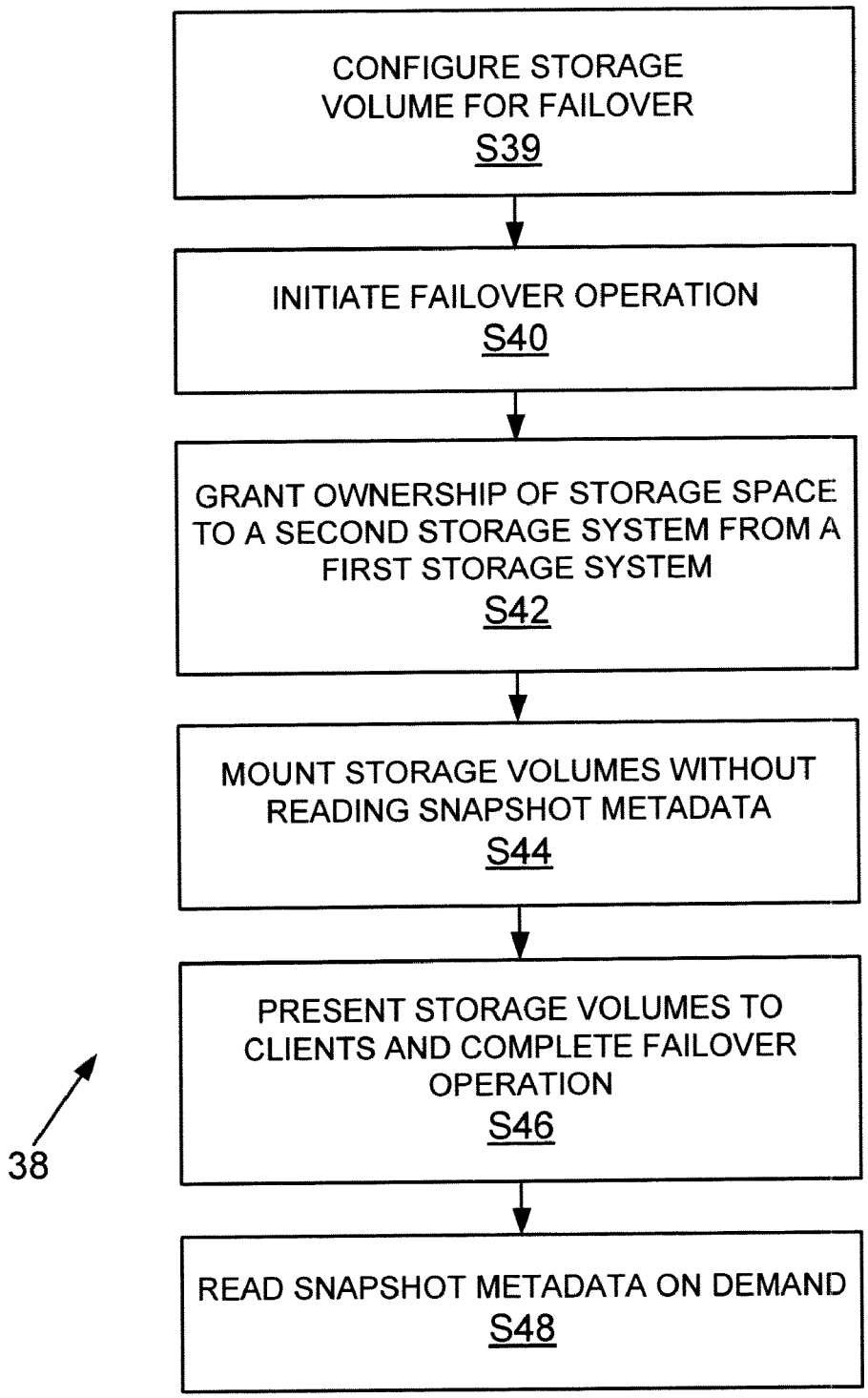
FIG. 1C shows a process flow diagram for managing storage units, according to one embodiment.
Figure 1D:
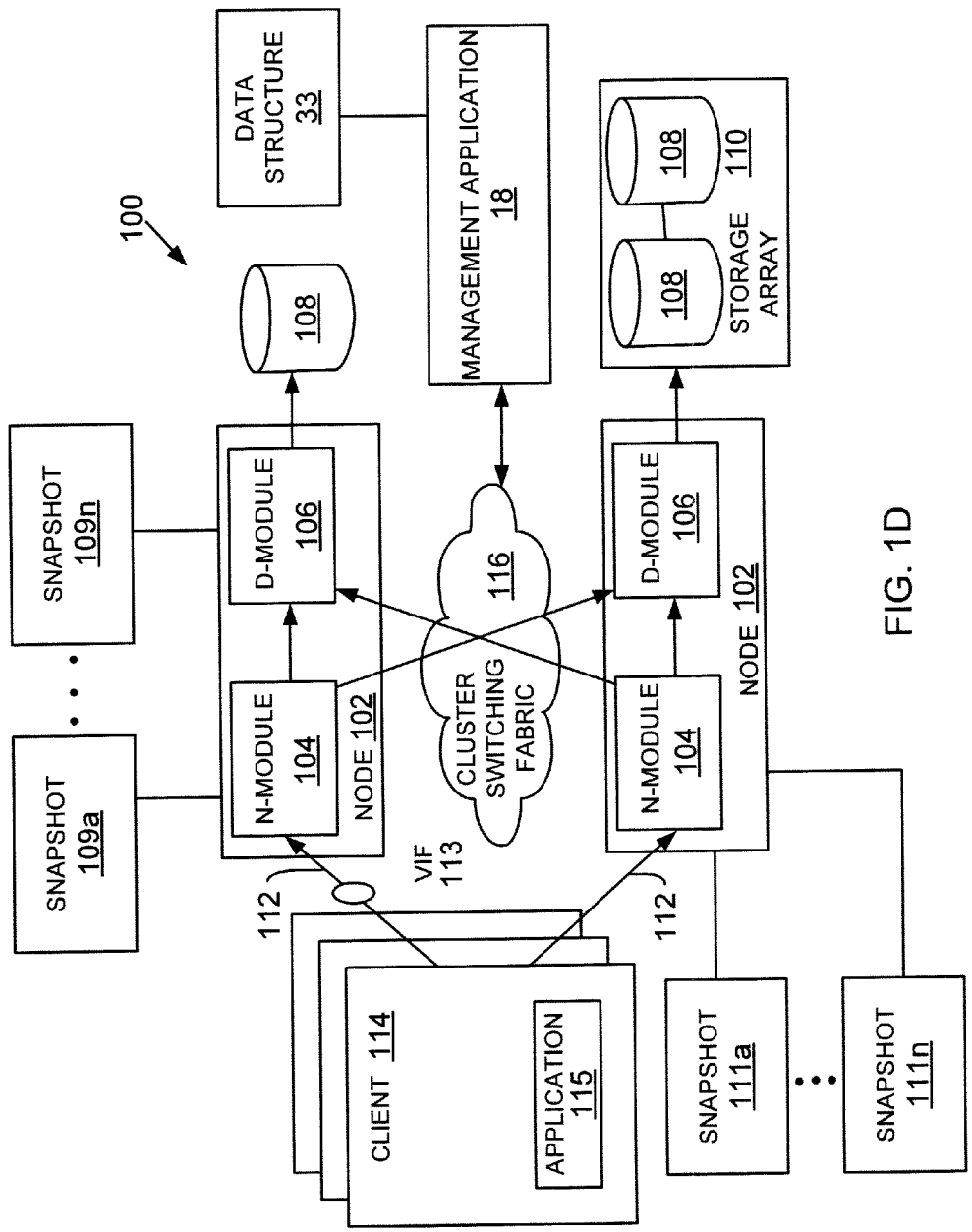
FIG. 1D shows an example of a cluster, used according to one embodiment.

Clustered System:

FIG. 1D shows a cluster 100 having a plurality of interconnected nodes 102 configured to provide storage services related to information stored at a plurality storage devices 108. The process flow of FIG. 1C described above is applicable to cluster 100 where a plurality of snapshots 109*a*-109*n* and 111*a*-11*n* are maintained among multiple nodes 102. If one node fails, then the storage space associated with the failed node is taken over by another node in a failover operation, without having to read the metadata associated with the snapshots maintained by the failed node. Data structure 33 maintained by management application 18 is used to select which node takes over the failed node.

Nodes 102 of cluster 100 comprise various functional components that cooperate to provide distributed storage system architecture of cluster 100. Each node 102 is generally organized as a network element (N-module 104) and a disk element (D-module 106). N-module 104 includes functionality that enables node 102 to connect to clients 114 over a computer network 112 and to management application 18, while each D-module 106 connects to one or more storage devices 108 (may generically be referred to as disks 108) or storage array 110 (similar to storage subsystem 24*a*, FIG. 1A).

Nodes 102 may be interconnected by a cluster switching fabric 116 which, in the illustrative embodiment, may be embodied as a Gigabit Ethernet switch. The cluster switching fabric may provide primary and secondary paths (not shown) to storage 108, similar to paths 31*a*, 31*b*, 32*a* and 32*b*. A secondary path is activated during a failover operation, as described above with respect to FIG. 1C. The failover operation is completed without reading any metadata associated with any affected snapshots, for example, snapshots 109*a*-109*n* and 111*a*-111*n*.

It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Clients 114 (similar to clients 12, FIG. 1A) may be configured to interact with the node 102 in accordance with a client/server model of information delivery. That is, each client 114 may request the services of the node 102, and the node 102 may return the results of the services requested by the client 114, by exchanging packets over the network 112.

The client 114 may issue packets using application 115 including file-based access protocols, such as the CIFS protocol or the NFS protocol, over TCP/IP when accessing information in the form of certain data containers. Data container means a block, a file, a logical unit of data or any other information. CIFS means the Common Internet File System Protocol, an access protocol that client systems use to request file access services from storage systems over a network. NFS means Network File System, a protocol that allows a user to access storage over a network.

Alternatively, the client 114 may issue packets using application 115 including block-based access protocols, such as the Small Computer Systems Interface ("SCSI") protocol encapsulated over TCP (iSCSI) and SCSI encapsulated over FCP when accessing information in the form of other data containers, such as blocks.

A switched virtualization layer including a plurality of virtual interfaces (VIFs) 113 is provided below the interface between the respective N-module 104 and the client systems 114, allowing the storage 108 associated with the nodes 102 to be presented to the client systems 114 as a single shared storage pool.

Figure 2:
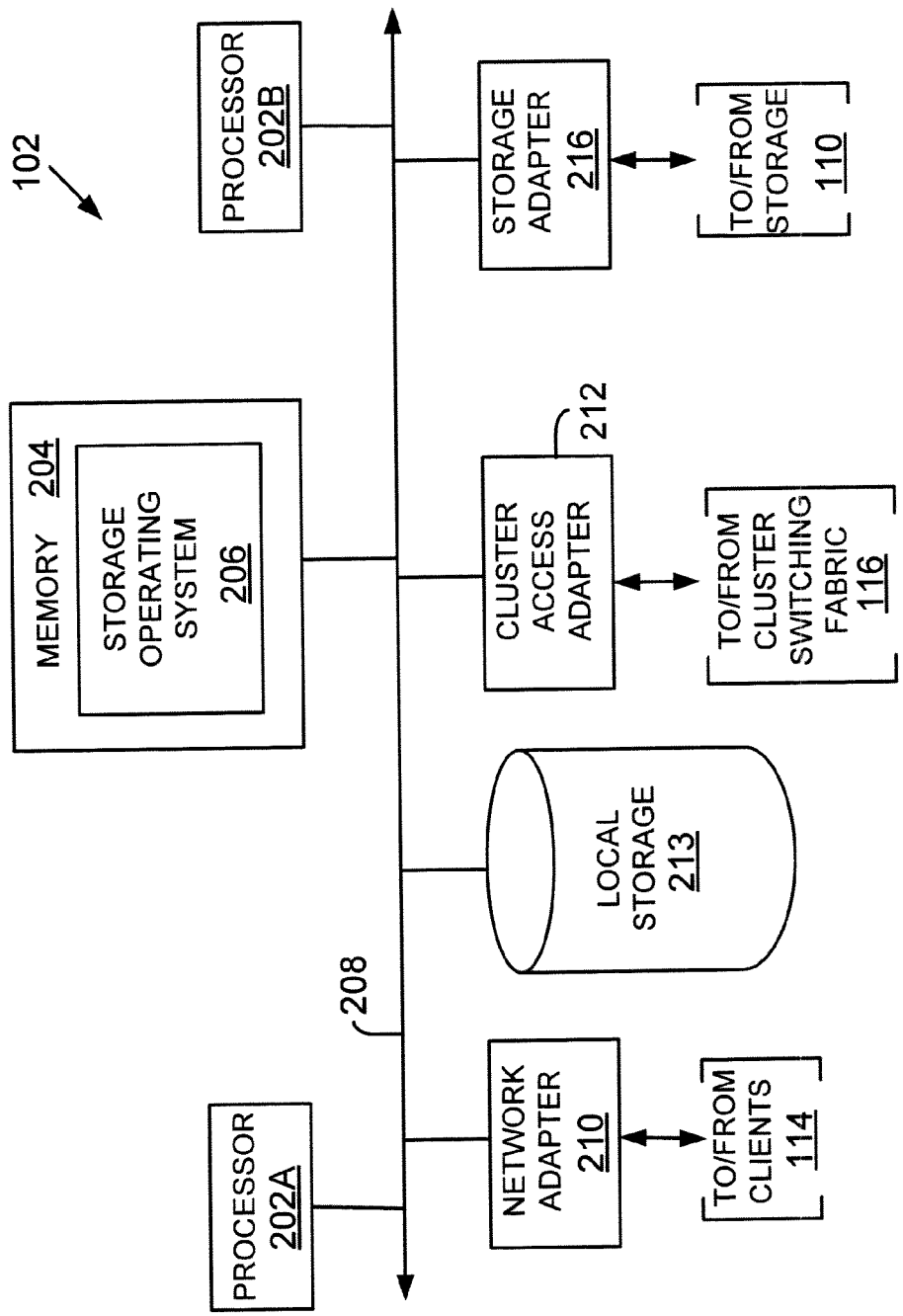
FIG. 2 shows the architecture of a node used in the cluster of FIG. 1D, according to one embodiment.

Storage System Node:

FIG. 2 is a block diagram of a node 102 that is illustratively embodied as a storage system, according to one embodiment. Node 102 may include a plurality of processors 202A and 202B, a memory 204, a network adapter 210, a cluster access adapter 212, a storage adapter 216 and local storage 213 interconnected by a system bus 208. The local storage 213 comprises one or more storage devices, such as disks, utilized by the node to locally store configuration information.

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

Each node 102 is illustratively embodied as a dual processor storage system executing a storage operating system 206 that preferably implements a high-level module, such as a file system, to logically organize the information as a hierarchical structure of named directories, files and special types of files called virtual disks (hereinafter generally "blocks") on storage devices 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 206, portions of which is typically resident in memory and executed by the processing elements, functionally organizes the node 102 by, inter alia, invoking storage operations in support of the storage service implemented by the node. An example of operating system 206 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network. Illustratively, the computer network 112 may be embodied as an Ethernet network or a FC network. Each client 114 may communicate with the node over network 112 by exchanging discrete frames or packets of data according to pre-defined protocols, such as TCP/IP.

The storage adapter 216 cooperates with the storage operating system 206 executing on the node 102 to access information requested by the clients and management application 18. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information. However, as illustratively described herein, the information is preferably stored on the disks 108 of storage array 110.

The storage adapter 216 comprises a plurality of ports having input/output (I/O) interface circuitry that couples to the disks over an I/O interconnect arrangement, such as a conventional high-performance, FC link topology. The storage adapter 216 may be a part of a primary or secondary path that is used during a failover operation, as described above.

In another embodiment, instead of using a separate network and storage adapter, a node may use a converged adapter to process both network and storage traffic.

Figure 3:
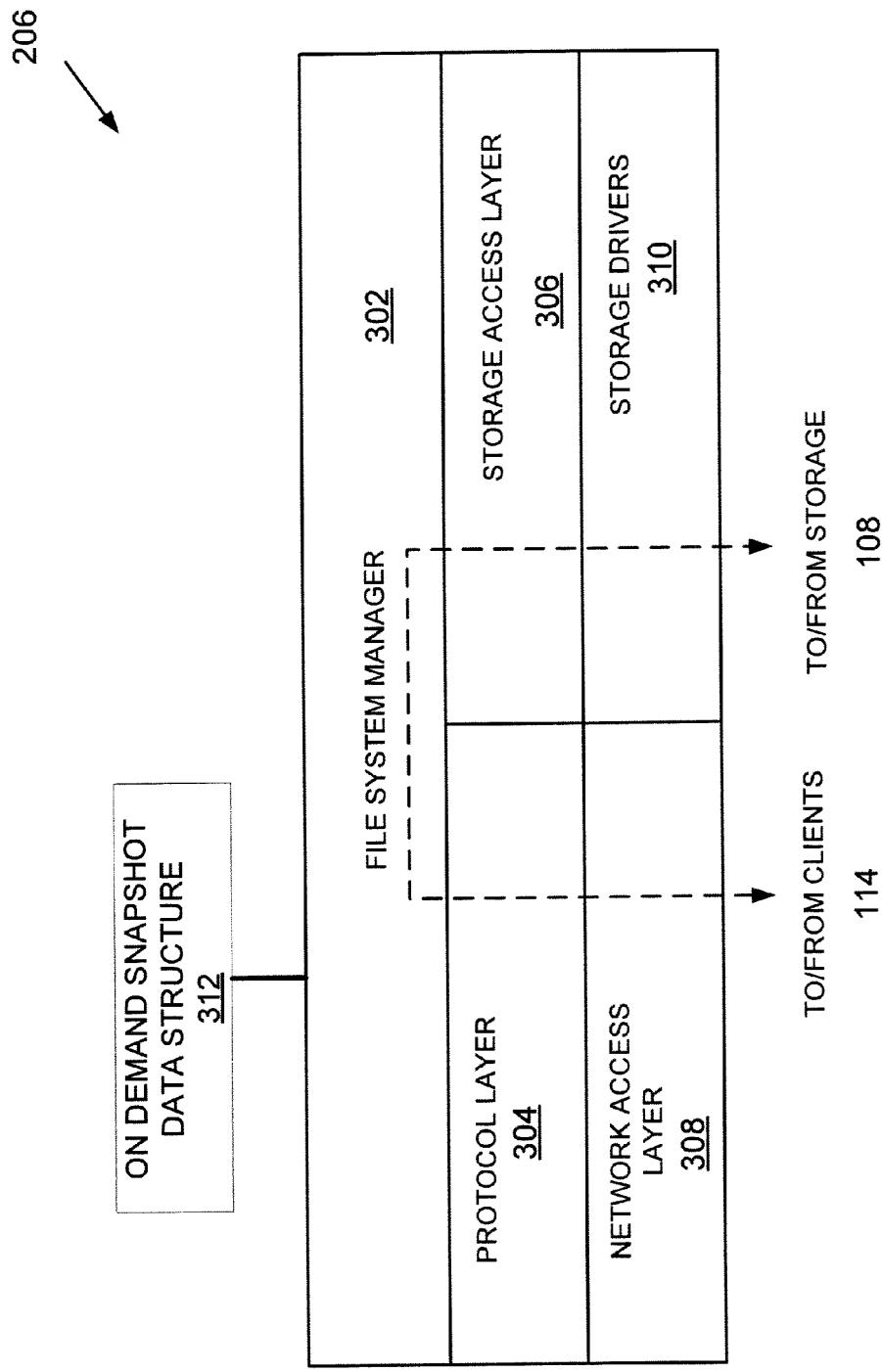
FIG. 3 shows an example of an operating system used according to one embodiment.

Operating System:

FIG. 3 illustrates a generic example of operating system 206 (or 22, FIG. 1A) executed by node 102, according to one embodiment of the present disclosure. Operating system 206 uses an on-demand snapshot data structure 312 (may be referenced as data structure 312) for responding to on-demand snapshot requests that may be received in block S48 of FIG. 10. In one embodiment, data structure 312 may be an application programming interface (API) that uses the metadata 36 (FIG. 1B) for responding to on-demand requests regarding snapshots that storage system 22b takes over after a failover operation.

In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e. executes read/write operations on disks in response to client 114 requests. File system 302 may also maintain snapshot data structure 36 described above with respect to FIG. 1B. In another embodiment, file system 302 may also maintain data structure 33 described above in detail.

Operating system 206 may also include a protocol layer 304 and an associated network access layer 308, to allow node 102 to communicate over a network with other systems, such as clients 114 and management application 18. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 102 in response to a file system request issued by client 114.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4:
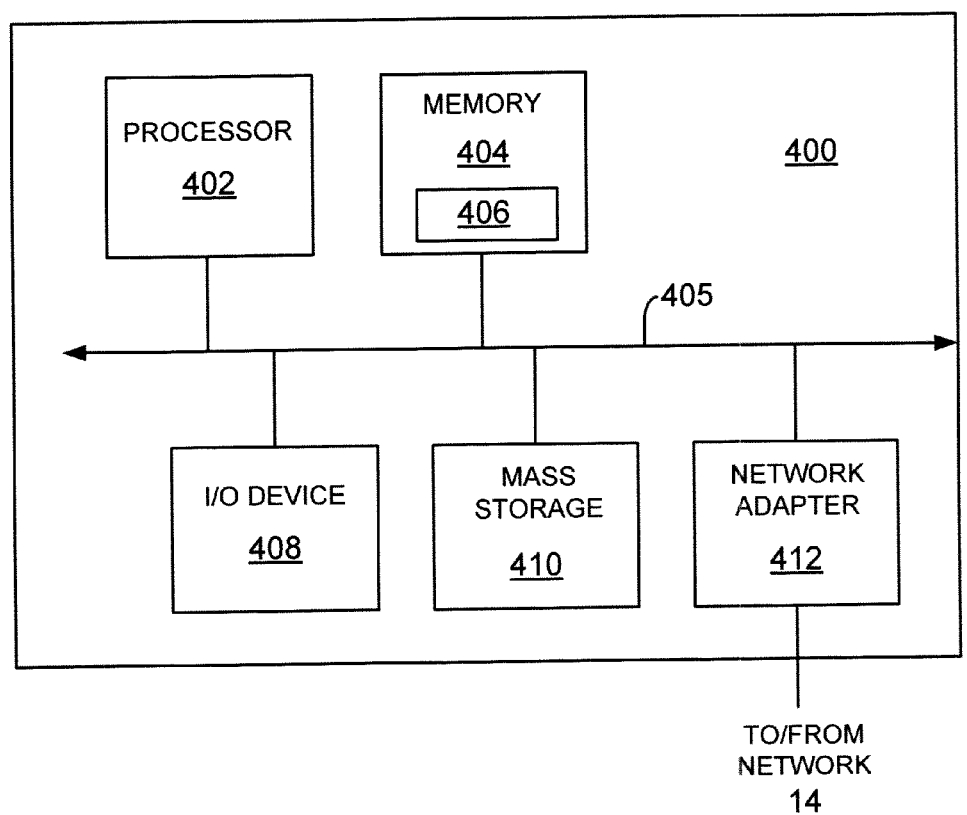
FIG. 4 shows a block diagram of a computing system for implementing the adaptive process of the present disclosure.

Processing System:

FIG. 4 is a high-level block diagram showing an example of the architecture of a processing system, at a high level, in which executable instructions as described above, can be implemented. The processing system 400 can represent management console 18, clients 12, storage system 20a-20b and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers 20a and 20b) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive embodiments.

Thus, a failover method and system is provided. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
    initiating a failover operation for transferring control of a storage volume from a first storage system to a second storage system; wherein the storage volume representing a segment of storage space at a storage sub-system is replicated at a point in time and stored with a data structure having information regarding the replicated copy;
    transferring control of the storage volume to the second storage system;
    presenting the storage volume to a client, without reading the data structure; and
    accessing the data structure after the failover operation when needed.

2. The method of claim 1, wherein the replicated copy is a snapshot.

3. The method of claim 2, wherein the data structure is a snapshot metadata stored by the first storage system.

4. The method of claim 1, wherein the first storage system and the second storage system are included in a non-cluster based system.

5. The method of claim 1, wherein the first storage system and the second storage system are included in a cluster based system.

6. A machine implemented method, comprising:
    presenting a storage volume to a client in response to a failover operation, without accessing a data structure that describes a replicated copy of the storage volume; wherein the replicated copy and the data structure is generated by a first storage system and the storage volume is presented by a second storage system that is configured to take control of the storage volume after a failover event; and
    accessing the data structure in response to an input/output (I/O) request to access the replicated copy; wherein the second storage system accesses the data structure to respond to the I/O request after the failover operation.

7. The method of claim 6, wherein the replicated copy is a snapshot.

8. The method of claim 7, wherein the data structure is a snapshot metadata stored by the first storage system.

9. The method of claim 6, wherein the first storage system and the second storage system are included in a non-cluster based system.

10. The method of claim 6, wherein the first storage system and the second storage system are included in a cluster based system.

11. A machine implemented method, comprising:
    configuring a storage volume to be managed by a first storage system and in case of an error event, be managed by a second storage system after a failover operation;

passing control of the storage volume from the first storage system to the second storage system, without accessing metadata describing a replicated copy of the storage volume that is generated by the first storage system; and accessing the data structure in response to an input/output request received by the second storage system to access the replicated copy; wherein the second storage system accesses the data structure to respond to the input/output request.

12. The method of claim 11, wherein the replicated copy is a snapshot.

13. The method of claim 12, wherein the data structure is a snapshot metadata stored by the first storage system.

14. The method of claim 11, wherein the first storage system and the second storage system are included in a non-cluster based system.

15. The method of claim 11, wherein the first storage system and the second storage system are included in a cluster based system.

16. A system, comprising:
a first storage system for managing a storage volume via a primary path; and
a second storage system configured to control the storage volume and presenting the storage volume to client via a secondary path in response to a failover operation without accessing a data structure storing information regarding a replicated copy of the storage volume.

17. The system of claim 16, wherein the second storage system accesses the data structure to respond to an input/output request involving the replicated copy.

18. The system of claim 16, wherein the first storage system and the second storage system are included in a non-cluster based system.

19. The system of claim 16, wherein the first storage system and the second storage system are nodes in a cluster based system.

* * * * *